US010744732B1

(12) United States Patent
McAdoo (10) Patent No.: US 10,744,732 B1
(45) Date of Patent: Aug. 18, 2020

(54) SYSTEM AND METHOD FOR TIRE RETREADING (71) Applicant: Sarah Janie McAdoo, Powder Springs, GA (US)

(72) Inventor: Sarah Janie McAdoo, Powder Springs, GA (US)

(*) Notice: Subject to any disclaimer, the term of this patent is extended or adjusted under 35 U.S.C. 154(b) by 0 days.

(21) Appl. No.: 14/066,974

(22) Filed: Oct. 30, 2013

Related U.S. Application Data (60) Provisional application No. 61/720,209, filed on Oct. 30, 2012.

(51) Int. Cl.
B29D 30/54 (2006.01)
B29D 30/56 (2006.01)
B29D 30/52 (2006.01)

(52) U.S. Cl.
CPC ............ *B29D 30/54* (2013.01); *B29D 30/52* (2013.01); *B29D 30/56* (2013.01); *B29D 2030/523* (2013.01); *B29D 2030/544* (2013.01)

(58) Field of Classification Search
CPC .. B29D 30/0629; B29D 30/54; B29D 30/542; B29D 30/56; B29D 2030/544; B29D 2030/545; B29D 2030/549; B29D 2035/0211; B29D 30/52; B29D 2030/523
USPC .................... 156/95, 96; 152/209.6
See application file for complete search history.

(56) References Cited

U.S. PATENT DOCUMENTS 2,157,967 A    5/1939 Riccio
2,259,975 A *  10/1941 Hewel ................... B29D 30/54
                                                425/23
2,570,657 A    10/1951 Fannen
2,904,842 A *  9/1959 Alm ................... B29D 30/0601
                                                264/315
2,938,100 A *  5/1960 Gibbs ..................... B29C 35/02
                                                219/477
3,020,831 A *  2/1962 Barnes ................... B29D 30/02
                                                100/232
3,038,984 A    6/1962 Snyder
3,060,508 A    10/1962 Duerksen (Continued)

FOREIGN PATENT DOCUMENTS

CN    201179708 Y     1/2009
GB        12128  *    1/1916    ......... B29D 30/0601

(Continued)

OTHER PUBLICATIONS

Machine generated English language translation of JP 05-138764 (original document date Jun. 1993).*

(Continued)

*Primary Examiner* — Robert C Dye
*Assistant Examiner* — Sedef E Paquette
(74) *Attorney, Agent, or Firm* — Bodi Law LLC (57) ABSTRACT Systems and methods for retreading a tire are disclosed. Embodiments include applying a layer of adhesive (e.g., Cushing gum) on the exterior of a prepared tire casing and a layer of pre-molded tread on the exterior of the adhesive. An inner electric heating pad is placed along the interior contour of the tire casing and/or an outer electric heating pad is placed along an exterior of the tread layer. The assembly is then cured by providing a force to the assembly while activating the heating pad(s) to cure the adhesive.

22 Claims, 9 Drawing Sheets

(56) References Cited

U.S. PATENT DOCUMENTS

| | | | | |
|---|---|---|---|---|
| 3,698,975 A | * | 10/1972 | Hogan | B29D 30/56 156/129 |
| 3,794,452 A | * | 2/1974 | Wolfe | B29C 73/305 425/15 |
| 3,809,592 A | | 5/1974 | Dennis et al. | |
| 3,868,284 A | | 2/1975 | Hogan, Sr. et al. | |
| 3,894,897 A | * | 7/1975 | Batchelor | B29D 30/56 156/128.6 |
| 3,920,498 A | | 11/1975 | Everhardt et al. | |
| 3,922,415 A | * | 11/1975 | Dexter | B29D 30/56 152/532 |
| 3,941,050 A | * | 3/1976 | Martindale | B29D 30/72 101/11 |
| 3,964,949 A | | 6/1976 | Kent et al. | |
| 4,039,366 A | * | 8/1977 | Yabe | B29D 30/28 156/126 |
| 4,058,422 A | * | 11/1977 | Taylor | B29D 30/54 156/421 |
| 4,201,610 A | | 5/1980 | Brodie et al. | |
| 4,203,793 A | | 5/1980 | Brodie et al. | |
| 4,284,451 A | * | 8/1981 | Conley | B29C 73/10 156/97 |
| 4,347,096 A | | 8/1982 | Schorscher | |
| 4,536,242 A | | 8/1985 | Gripenholt et al. | |
| 4,708,608 A | * | 11/1987 | DiRocco | B29C 33/02 156/381 |
| 4,819,177 A | * | 4/1989 | Jurgensen | B29C 35/0288 264/236 |
| 5,007,978 A | | 4/1991 | Presti | |
| 5,084,080 A | * | 1/1992 | Hirase | B01D 53/68 422/174 |
| 5,098,268 A | | 3/1992 | Robinson | |
| 5,462,630 A | * | 10/1995 | Murakami | B29D 30/0606 156/275.5 |
| 5,536,348 A | | 7/1996 | Chlebina et al. | |
| 5,630,894 A | * | 5/1997 | Koch | B65C 9/24 156/286 |
| 5,653,847 A | | 8/1997 | King | |
| 5,827,380 A | | 10/1998 | Chlebina et al. | |
| 5,908,523 A | | 6/1999 | Thacher | |
| 6,089,290 A | | 7/2000 | Chlebina et al. | |
| 6,264,779 B1 | | 7/2001 | Cappelli et al. | |
| 6,267,084 B1 | | 7/2001 | Louchart, III | |
| 6,630,044 B1 | | 10/2003 | Boling et al. | |
| 8,109,312 B2 | * | 2/2012 | Schober | B29C 73/12 152/367 |
| 2003/0054060 A1 | * | 3/2003 | Scheungraber | B29C 35/02 425/26 |
| 2004/0086336 A1 | * | 5/2004 | Nelson | E01C 19/407 404/72 |
| 2005/0279443 A1 | * | 12/2005 | Chapman | B29D 30/54 156/96 |
| 2009/0165928 A1 | | 7/2009 | Schober | |
| 2010/0307622 A1 | * | 12/2010 | Lee | F16L 11/12 138/33 |

FOREIGN PATENT DOCUMENTS

| | | | | |
|---|---|---|---|---|
| JP | 05-138764 | * | 6/1993 | ............. B29D 30/56 |
| JP | 2011-42093 | * | 3/2011 | ............. B29D 30/58 |
| RU | 2154576 C1 | | 8/2000 | |
| SU | 1140981 A | | 2/1985 | |
| SU | 1308187 A3 | | 4/1987 | |
| WO | 2010151263 A1 | | 12/2010 | |

OTHER PUBLICATIONS

Machine generated English language translation of JP 2011-42093 (original document dated Mar. 2011).*

Watlow Product Catalog (Year: 2011).*

* cited by examiner

SYSTEM AND METHOD FOR TIRE RETREADING

CROSS-REFERENCES TO RELATED APPLICATIONS

This application claims the benefit of provisional application Ser. No. 61/720,209 filed on Oct. 30, 2012, and incorporated herein by reference.

BACKGROUND

The application relates to tire retreading and, more particularly, to a tire retreading system and method that leverages dedicated electric heating pad elements for targeted, individualized control of the curing process for each of one or more tires.

Traditionally, the casings of used tires can be fitted with new tread and placed back into service. Before a tire casing can be retreaded, however, the condition of the casing sidewall must be inspected from shoulder to bead to insure that the casing meets a quality standard suitable for retread. Weak areas within the casing can be marked for repair prior to the eventual application of a pre-molded retread layer. Various conditions which compromise the quality of a tire casing include, among other conditions, zippers, road hazard damage, run-flat abuse and prior repair scars Once the condition of a casing has been qualified, the casing may be buffed to prepare the old tread surface for receipt of a new retread layer. Proper texture of the casing after being buffed will strengthen the new tread to casing bond. Further, some processes may also buff the undertread contour of the casing, as a desirable undertread contour is known to contribute to a final product that is more likely to meet the performance and wear standards of an OEM tire. Some retread processes employ automated radial buffing systems that may include, among other aspects, casing specification databases and continuous undertread measurement devices that collaborate to ensure optimal undertread depth in the casing after buffing. Alternatively, other retread processes use rudimentary computer controlled or physical templates, circumferential buffing devices and pilot skives to measure undertread thickness.

Once imperfections or defects are detected, whether before or after the buffing process, repairs are made prior to receipt of the new tread. Depending on the particular retread process, repairs may be made via either heat cure methods or chemical cure methods. Generally, heat cure methods are preferred in the industry, as the result is an improvement over chemical cure methods with regards to final adhesion and tear resistance.

After inspection and repair, a buffed tire casing is ready to receive a new tread. First, a hot layer of cushion gum is extruded or wrapped onto the casing to promote a strong tread-to-casing bond. Notably, the layer of cushion gum not only provides a bonding layer between the casing and the new tread layer, but also serves to fill skives and "buzzouts" that may be present on the surface of the casing. After the cushion gum layer is applied, a pre-molded tread layer is wrapped over the cushion gum and temporarily secured in place.

Next, the casing, cushion gum and tread layer retread package is placed inside a vacuum envelope. Some processes utilize a single vacuum envelope applied over the outside of the retread package and sealed against the beads of the casing with rings. Other processes, however, apply inner and outer vacuum envelopes that work together to seal around the entire retread package and apply uniform pressure to the exterior and interior surfaces of the retread package during molding. Other processes use a combination of a vacuum envelope on the outer application to apply a pressure to the retread package during the molding process. A vacuum is applied to the envelope(s), thus pressing the casing, cushion gum layer and tread layer together with a uniform pressure. The enveloped tire package is then placed inside a heated curing chamber for the period of time required to bond the layers together and achieve proper cross-linking or curing of the tire.

Multiple retread packages, each comprised of a casing, cushion gum layer and retread layer that are surrounded by a vacuum envelope, may be placed inside a curing chamber or autoclave. Once inside, electric or steam heating elements are used to heat the air inside the curing chamber to a temperature suitable for curing the retread packages. The heated air is circulated around the multiple retread packages in order to cure the tires.

One of ordinary skill in the art will recognize that there are many disadvantages to the retread methods and systems presently known in the art. A few of the disadvantages are:

i. By using a single, large heating element to heat the air inside the autoclave, present systems and methods are susceptible to manufacturing downtime when a heating element fails.

ii. Because the heated air must be constantly circulated to effectively cure the tire packages, present systems and methods are prone to mechanical failure of the fans.

iii. To heat the air within the autoclave of present systems and methods, it is also necessary to heat the entire curing chamber. Heating the entire chamber is an inefficient, and costly, use of energy.

iv. Because present systems and methods are limited to a single air temperature and curing time, a plurality of retread packages curing in the chamber must comprise identical or similar components. That is, the tires that are being retread in a given curing cycle must be of the same type. This limitation forces manufacturing methods using present retread systems to apply an inefficient "batch" approach.

v. Because thermal energy intended for curing the retread packages is wasted in the present systems and methods by heating the air and curing chamber, curing cycle times are unnecessarily long.

Therefore, what is needed in the art is a system and method for retreading tires that overcomes one or more of the above limitations and problems, as well as other limitations and problems, of the prior art.

BRIEF SUMMARY

Various embodiments, aspects and features disclosed herein encompass a system and/or a method that leverages dedicated electric heating pad elements for targeted, individualized control of the curing process for each of one or more tires. One preferred and exemplary embodiment is a system that includes an inner vacuum envelope, an outer vacuum envelope, an inner heater pad having an insulation layer and suitable for placement along the undertread contour of a tire casing, and an outer heater pad having an insulation layer and suitable for placement around the surface of a retread layer. Means of applying pressure to the parts is provided. Other exemplary embodiments may further comprise elements such as, but not limited to, a temperature sensing component, a vacuum source, a pressure source, a curing chamber and a control system.

In one exemplary embodiment, a tire casing is fitted with a layer of cushion gum and a retread layer to form a retread package. On the interior of the tire casing, an inner heating pad element with an embedded temperature sensor is placed along the underside contour of the tread such that an insulation layer attached to the heating pad element serves to retard energy generated by the heating pad element from radiating away from the tire. Similarly, on the exterior of the tire casing, an outer heating pad element with an embedded temperature sensor can be placed over the outer surface of the retread layer such that an insulation layer attached to the heating pad element serves to retard energy generated by the heating pad element from radiating away from the tire. Alternatively, the outer heating pad element may be placed on an outside of an envelope such as described below.

Next the retread "package," which includes the casing, cushion gum layer, retread layer and inner and/or outer heating pad elements, is provided with a means of pressure during the curing process to ensure that the retread layer stays in forced contact with the tire casing during curing. Control and power wires leading to the inner and outer heating pads may be "slipped" between the mated seal of the inner and outer vacuum envelopes and routed to a control system and power source. Power applied to the inner and outer heating pads supplies thermal energy to the package. The applied pressure and thermal energy operate to cure the retread package to form a usable tire.

Provided are a plurality of example embodiments, including, but not limited to, a method for performing a tire retread, comprising the steps of:
  placing a layer of adhesive on an outer surface of a tire casing;
  placing a retread over the adhesive layer on the tire casing to form a retread package;
  placing a heating device in contact with the retread package;
  applying a force to the retread package to compress the adhesive layer between the tire casing and the retread; and
  while applying said force, using the heating device to heat the retread package to cure said adhesive.

Also provided is a curing package for curing a retread package including a tire casing, a retread, and an adhesive provided between said tire casing and said retread, said curing package comprising: at least one heating device provided in contact with said retread package for providing heat to said retread package during the curing; a structure in contact with said retread package adapted to transmit a force to said retread package for compressing said adhesive between said tire casing and said retread; and a device adapted for providing said force.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE EXAMPLE EMBODIMENTS

Embodiments and aspects disclosed herein provide a system and/or a method that leverages dedicated electric heating pad elements in direct or indirect contact with a tire retread package for targeted, individualized control of the curing process for each of one or more tires. Various embodiments provide for curing a tire retread package, or packages, in at least some embodiments without having to heat and circulate a volume of air. Other embodiments provide for curing a tire retread package, or packages, without having to heat up a curing chamber. Still other embodiments provide for curing a tire retread package, or packages, on an individualized, custom controlled basis such that temperature, pressure, ramp times, soak times, cycle times, cycle profiles and the like may be customized for each retread package of a plurality of retread packages undergoing a simultaneous curing process. Other advantageous features and aspects of the present systems and methods will be apparent to one of ordinary skill in the art.

Figure 1:
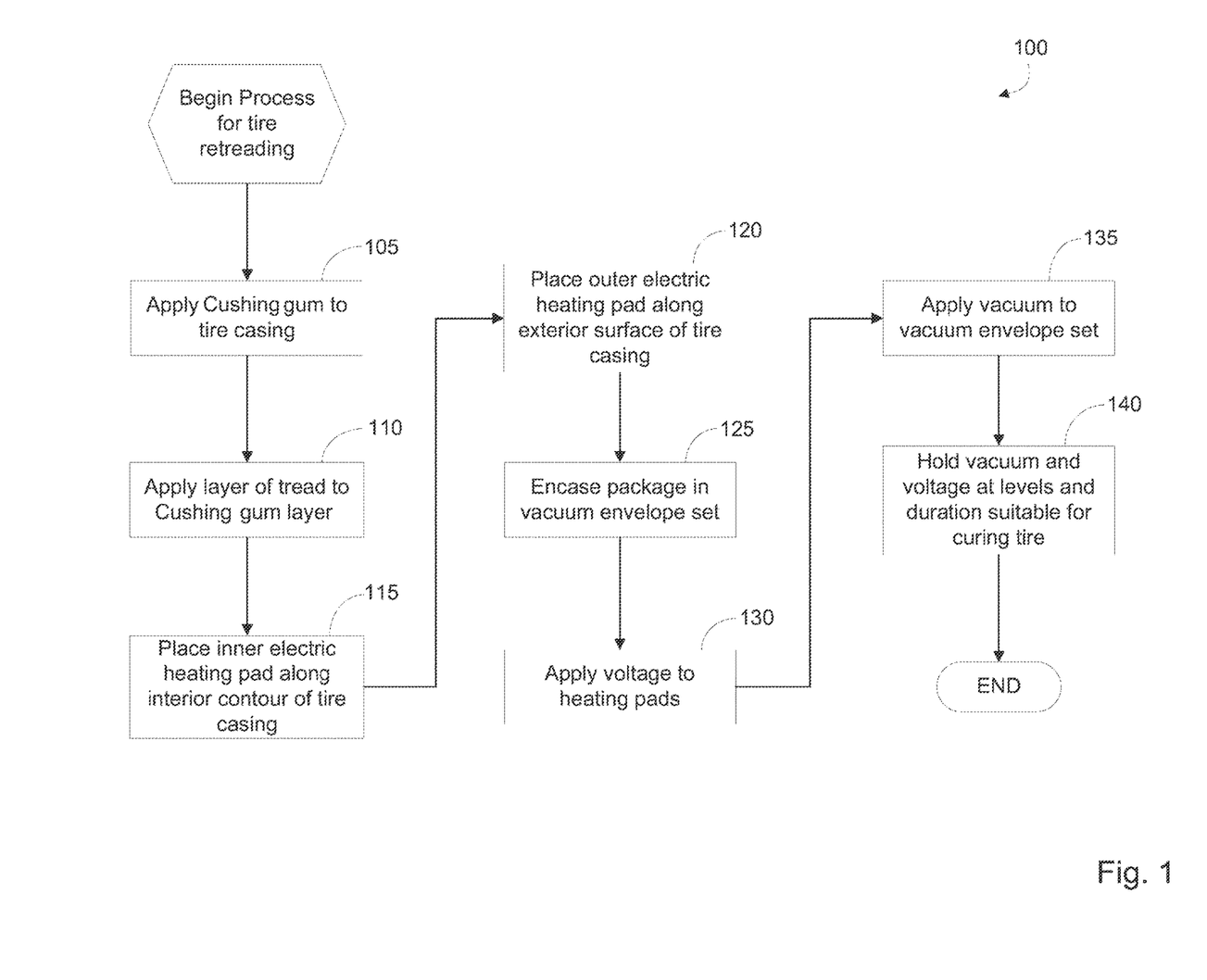
FIG. 1 is a flow chart illustrating an exemplary method for retreading a tire according to one embodiment.

FIG. 1 is a flow chart illustrating an exemplary method 100 for retreading a tire according to one example embodiment. A layer of cushion gum is applied on the exterior of a prepared tire casing 105. A layer of pre-molded tread is applied on the exterior of the cushion gum layer 110. An inner electric heating pad is placed along the interior contour of the tire casing 115 in direct or indirect (e.g., with one or more intervening components) contact with the tire casing 115. An outer electric heating pad is placed along the exterior surface of the retread layer 120 in direct or indirect contact (e.g., with one or more intervening components) with the retread layer 120. For at least some embodiments, only one of the inner or outer heating pads may be utilized.

In a situation where an autoclave is to be used to support the retread process, a retread package comprising the tire casing, cushion gum layer, and tread layer is provided with one or more heating pads that are encased in a vacuum envelope set for placing in the autoclave 125. A voltage is applied to the inner and outer electric heating pads 130. Notably, one of ordinary skill in the art will recognize that application of the voltage to the heating pads will cause the heating pads to generate thermal energy. A vacuum is applied to the vacuum envelope set by the autoclave 135. Notably, one of ordinary skill in the art will recognize that applying the vacuum to the vacuum envelope set will serve to compress the casing, cushion gum and tread layers together. The force created by the vacuum pull on the envelope set and the thermal energy generated by the voltage application on the heater pads may be maintained for a period of time suitable to "cure" the tire 140. That is, one of ordinary skill in the art of rubber molding will recognize that holding the casing layer, cushion gum layer and tread layer under pressure (via action of the envelope in the autoclave) and temperature (due to heating by the heating pad or pads and, if utilized, heated air in the autoclave) will cause the layers to be bonded together forming a retreaded tire for sale and use.

The example process of FIG. 1 may be altered in any of a number of ways, some of which are discussed in more detail below. For example, alternative embodiments dispose of the autoclave by providing pressure on the tread for retreading using alternative means, such as by using a mold (such as already used in some retread processes, but by adding one or more heating elements within the retread package inside the mold), or by encompassing the tire in an envelope and then using a compressive band, hydraulic pressure, or using an inner tube placed in an interior of the tire to push outwardly on the wall of the tire casing to push the tire casing outward into the tread and thus into the envelope, providing desired pressure to secure the tread to the tire casing.

Using Exterior Heating Pad Element(s)

Figure 2:
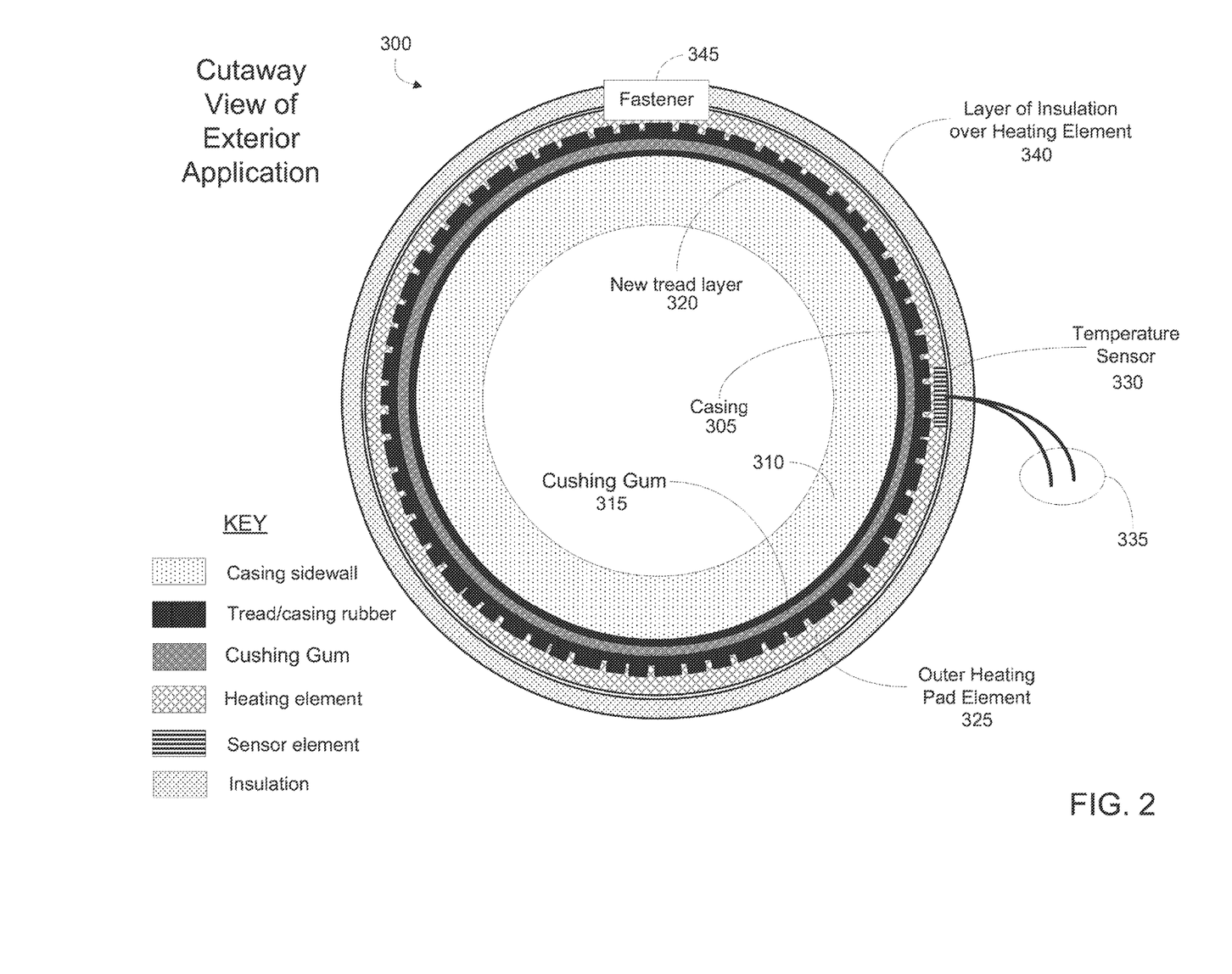
FIG. 2 illustrates a cross-sectional view of an example embodiment of an exterior heating pad application for a tire retread package.

FIG. 2 illustrates a cross-sectional view 300 of an example embodiment using an exterior (outer) heating pad application for a tire retread package. A tire casing 305 having a sidewall 310 is depicted with an applied layer of cushion gum 315 provided on an outer perimeter of the casing 305 and a retread layer 320 provided such that the cushion gum 315 is provided between the retread layers 320 and the tire casing 305. Encircling the exterior surface of the retread layer 320 is an outer heating pad element 325 that comprise electric heating elements and a temperature sensor 330 for monitoring the temperature of the tire. This temperature can be provided to a control system for monitoring the progress and for control of the curing process.

The outer heating pad element 325 can be secured via a fastener mechanism 345 for fastening the ends of the heating pad element 325 together. Control and power wires 335 connecting to the heating elements (not shown) and temperature sensor 430 are provided leading from the sensor 330 and outer heating pad element 325. The control portion of the wires 335 are provided in communication with the control system. Power to the outer heating pad 325 via the wires 335 cause the heating elements of the outer heating pad element 325 to generate thermal energy useful for causing tread layer 320 to bond to casing 305 via curing of cushion gum layer 315. Curing temperatures may be in the range of 250 to 350 degrees Fahrenheit, for example, although it is envisioned that other curing temperatures outside such range may be applied in some embodiments. Notably, the addition of insulation layer 340 provided over the heating pad element 425 may advantageously retard radiation of thermal energy generated by outer heating pad element 325, thereby insulating the heating pad element and directing generated thermal energy into and through retread layer 320. Alternatively, another envelope may be provided around the retread under the outer heating pad element. The outer heating pad element then may be applied around an exterior of the additional envelope, with the outer envelope provided around the outer heating pad to encase the tire retread package. Use of the additional envelope against the retread package can help to stop Cushing migration between the lugs of the new retread.

Using Interior Heating Pad Element(s)

Figure 3:
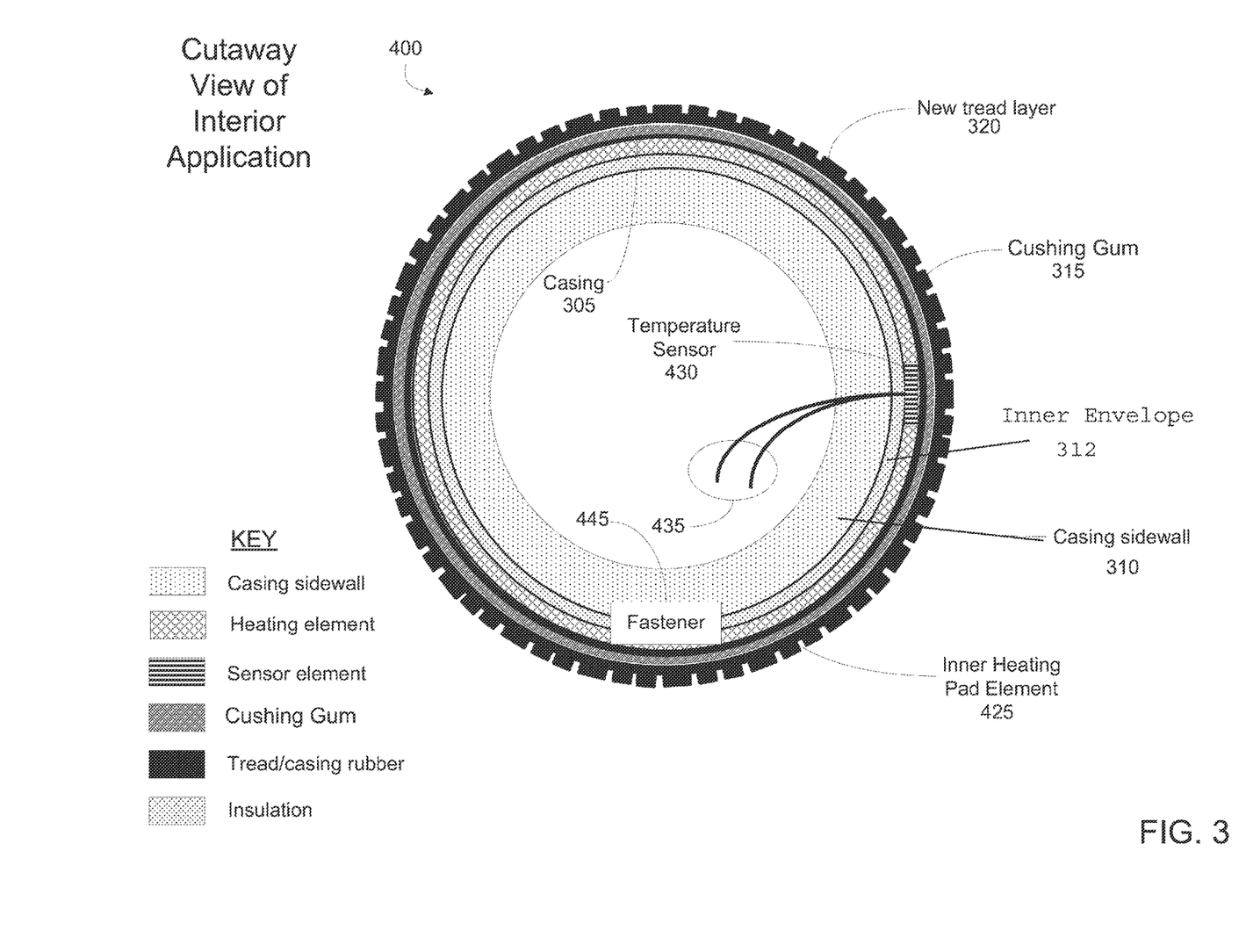
FIG. 3 illustrates a cross-sectional view of an example embodiment of an interior heating pad application for a tire retread package.

FIG. 3 illustrates a cross-sectional view 400 of the interior (inner) heating pad application for a tire retread package, according another example embodiment. As described above relative to view 300 of FIG. 2, the casing 305 is fitted with a layer of cushion gum 315 and retread layer 320 to form the tire retread package. In the interior of casing 305, an interior heating pad element 425 is placed along the contour of the casing that is proximate to the cushion gum 315 and retread 320 layers. The interior heating pad element 425 may be secured via a fastener mechanism 445 on an inner envelope 312 to hold the heating pad in place, for example, or it may be secured in place through use of an inflatable bladder, such as described below with respect to FIG. 7. Use of the inner envelope 312 and fastener mechanism 445 may be supplemented or may alternatively utilize, other means for ensuring that the interior heating pad element 425 remain in contact with the inner wall of the casing 305, such as by using a stiff substrate or a spring loaded mechanism to push the interior heating pad element 425 outwardly into the tire wall.

Control and power wires 435 are provided leading from the sensor 430 and inner heating pad element 425 to be in communication with a control system. Power to the inner heating pad 425 will cause the inner heating pad 425 to generate thermal energy useful for causing tread layer 320 to bond to casing 305 via curing of cushion gum layer 315. Notably, the addition of an insulation layer (not shown) or an insulated bladder (not shown) may advantageously retard radiation of thermal energy generated by inner heating pad element 425, thereby directing generated thermal energy into and through casing 305 and cushion gum layer 315.

Forming the Tire Curing Package

Figure 4A:
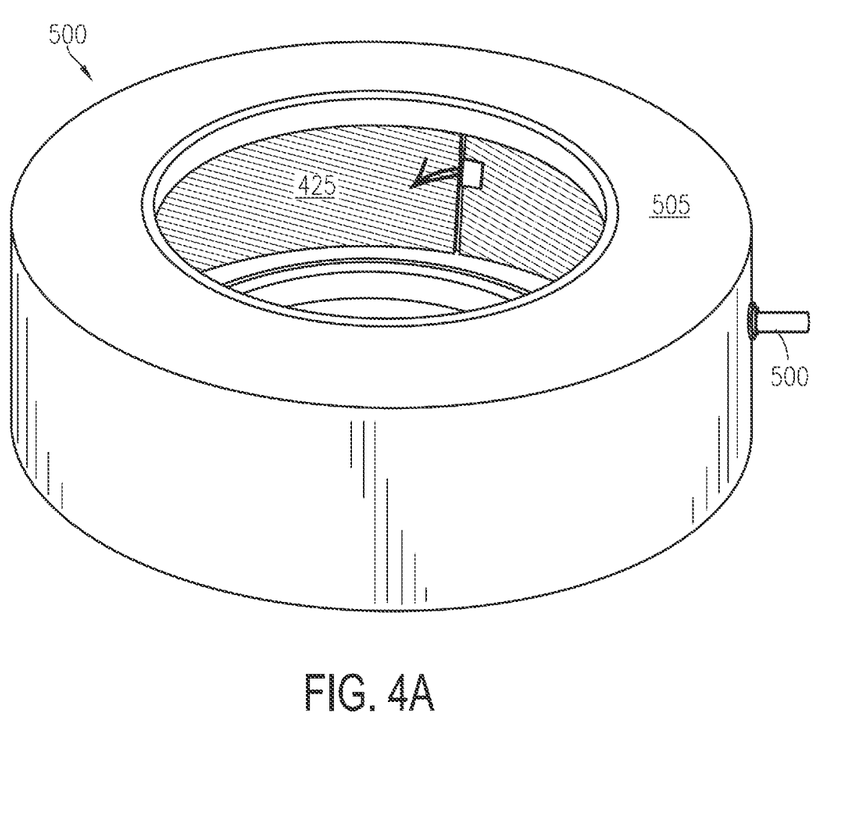
FIG. 4A illustrates an example tire retread package adding an outer vacuum envelope and interior heating pad element such as utilized in FIG. 3.

FIG. 4A is an illustration of an exemplary tire curing package according to an example embodiment, showing an outer vacuum envelope 505 and an interior heating pad element 425 applied to a retread package. As is known to one of ordinary skill in the art, pressure may be applied to the casing, gum rubber and retread layer of the retread package via a vacuum drawn from a nozzle 510. The vacuum causes the envelope 505 to "squeeze" the casing, gum rubber and retread together. The envelope 505 could be constructed of a flexible material, such as a rubber or flexible plastic, for example, that can be stretched around the retread package, for example. Although not shown, this envelope 505 may be provided with open ends or in more than one piece such that it can be assembled around the tire, tread, and heating element components. These pieces might result in the envelope 505 having a single set of ends for moving apart to allow insertion of the tire package, or it may have two, three, or more seams radially extending from the axis of the tire curing package for assembling two, three, or more arcuate portions of the envelope 505 about the tire, or alternatively the envelope 505 may have a seam around a circumference of the envelope 505 to assembly two halves of the envelope 505 about either side of the tire. A clamp may be provided (such as the clamp shown in FIGS. 5A-5C) to lock the outer vacuum envelope portions in place around the tire. As described above, for some retread methods, the outer heating pad may be provided in indirect contact with the retread package by arranging the outer heating pad around the outer perimeter (e.g., outer circumference) of the envelope 505 rather than within the envelope in direct contact with the retread 320. This also avoids the need of passing wires of the outer heating pad through the envelope 505.

Figure 4B:
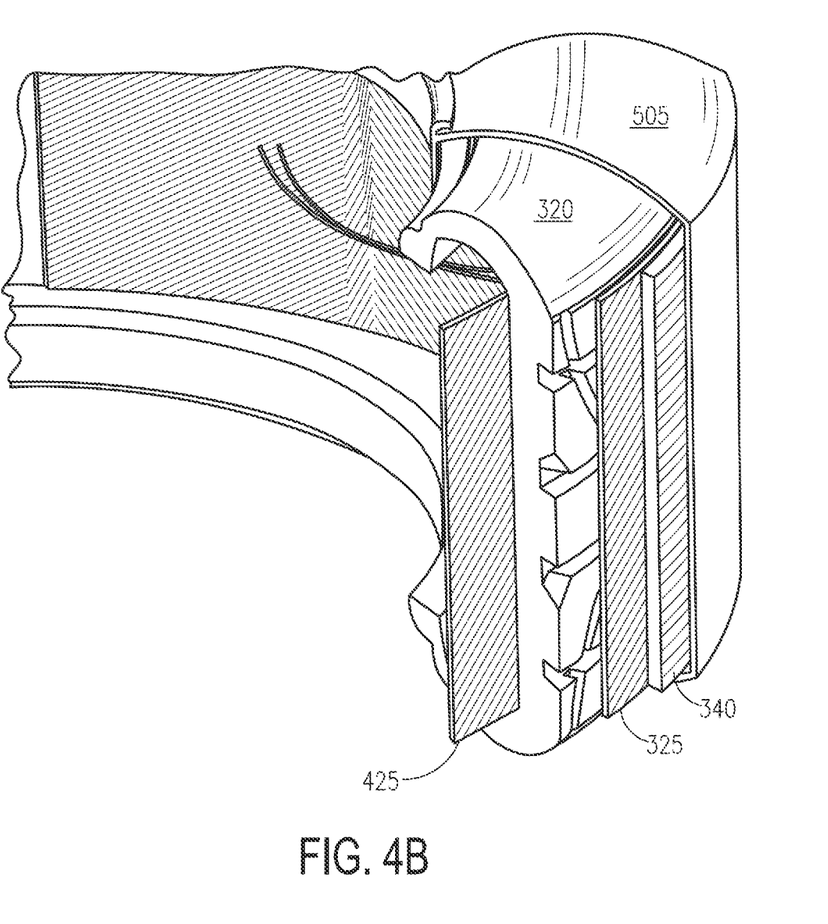
FIG. 4B is illustrates an example tire retread package adding an outer vacuum envelope and an interior heating pad element such as utilized in FIG. 2.

FIG. 4B illustrates an alternative embodiment of a tire curing package with a cutaway illustration showing the use of both an inner and an outer heating pad elements 425, 340 arranged with the retread package. If desired, the inner heating pad element may not be utilized for some retreading embodiments, or it may be provided on the outside of an outer envelope rather than against the retread 325. In the FIG. 5 and FIG. 6 embodiments, an outer vacuum envelope 505 is applied over the outer heating pad element 340 and retread envelope 325. The retread envelope 325 is provided to prevent seepage of the adhesive, and may be omitted where not necessary. As previously noted, however, it is envisioned that some embodiments may have complimentary inner and outer vacuum envelopes or an outer vacuum envelope working in conjunction with an inner bladder, for example, as part of the curing package.

As can be seen in the FIG. 4B view, an inner heating pad element 425 is placed inside the casing (and may be held in place using an inner envelope, not shown) and an outer heating pad element 340 is placed on the inner envelope 325 which is provided on the exterior of the new tread layer 320. An insulation layer may be provided on the outer surface of the exterior heating pad element 325 or it may be incorporated into the retread envelope. The exterior envelope 505 may be operable to apply a force that compresses the various layers together during the curing process, such as through use of a nozzle and vacuum as for the example shown in FIG. 4A.

Notably, the disclosed exemplary embodiments of these resulting tire retread packages, and their equivalents, are not limited in applicability to any particular type, manufacturer or supplier of casings, cushion layers or retread layers. A non-limiting list of cushion gum types includes all cushion gums, adhesives, or their equivalents, that may be supplied by any manufacturer for this purpose, such as, for example, provided by Meyers Tire Supply and/or Oliver Rubber. Further, a non-limiting list of retread layer types includes all retread layers, or their equivalents, that may be supplied by Michelin, Bridgestone/Firestone, Bandag, Goodyear and/or Marangoni.

First Example Curing System

Figure 5A:
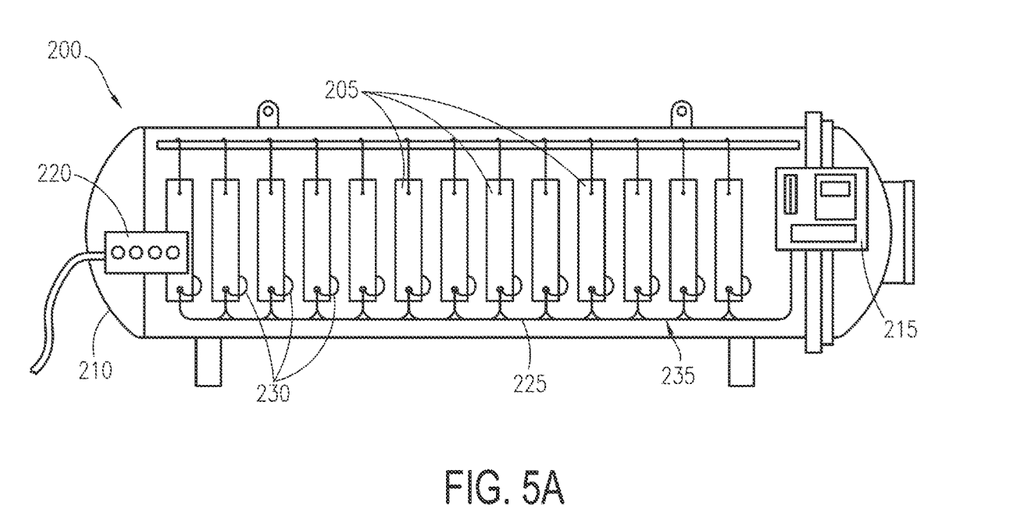
FIGS. 5A and 5B depicts a system and/or a method utilizing an autoclave for curing the tire retread package such as those disclosed in the above figures.
Figure 5B:
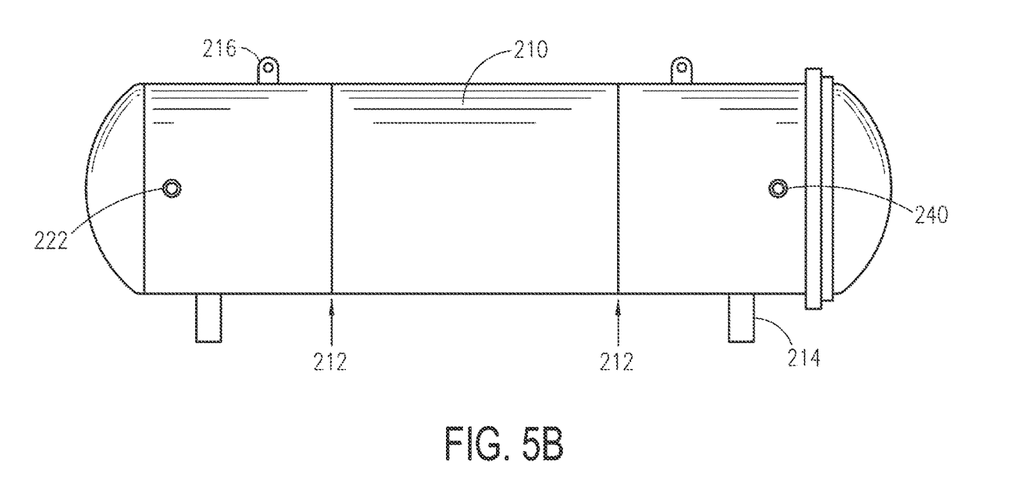

FIGS. 5A and 5B depict an example curing system 200 according to one embodiment that leverages dedicated electric heating pad elements as described herein for targeted, individualized control of the curing process for each of one or more curing packages 205 through the use of an autoclave 210. This exemplary embodiment 200 comprises a curing chamber 210 (such as an autoclave, for example) a plurality of curing packages 205 (such as described herein, for example), a control system that may include a programmable logic controller 215 and a vacuum system 220. It is envisioned that the curing chamber 210 may be constructed of any material suitable for containing one or more curing packages 205, including, but not limited to, carbon steel, stainless steel, plastic, etc. This chamber 210 may be provided in parts such as with seams 212 for ease of assembly. One or more lifting lugs 216 can be provided to enable lifting of the various parts, for example, and legs 214 used for supporting the chamber 210.

Each tire curing package 205 may be tethered to the control system 215 via a dedicated control and power link 225 that may include a temperature loop and/or a pressure loop and/or a power loop. Further, each tire curing package 205 may be tethered to the vacuum system 220 connected to a source of vacuum such as via nozzle 222, such that a vacuum may be applied to each tire curing package 205 via use of a nozzle provided in each one of the envelopes (described above), or the vacuum may be provided to the entire interior of the chamber 210 in which case the envelope nozzles act to connect the tire curing package to the interior vacuum. Other embodiments may replace the vacuum system with, or further include, a pressure system (not shown) in place of the vacuum system for providing a force to the interior of a tire retread package 205 via a bladder, or pressure might be applied to the envelope via nozzles. The pressure applied to each tire curing package 205 may be substantially 80 psi, although it is envisioned that other pressures above or below 80 psi may be applied in some embodiments. Heated air might also be provided in the chamber 210 by a heated air system via nozzle 240, for example, to supplement the heating provided by the heating pads, or a heated air system may be included within the chamber 210.

Advantageously, because each tire curing package 205 may be individually controlled via a dedicated control link 225, customized temperature and/or pressure inputs may be provided on a per curing package 205 basis. Further, because each tire curing package 205 is individually controlled and curing temperature provided internal to a given curing package 205, one of ordinary skill in the art will recognize that an air circulating system, such as system 125 in FIG. 1, may not be required for some embodiments.

An example process of retreading using system 200 involves placing the tire with casing, new tread, and cushion gum into an envelope to form the curing package and then putting the curing package into a curing chamber, such as an autoclave. The curing chamber applies heat and pressure which cures the tire, the cushion gum, and casing into a cured retread tire. The curing chamber applies pressure through use of a vacuum or pressure source, thus applying all around pressure to the tire and tread provided in the envelope. The heat can be applied in any combination of three different ways. One way of providing heat is to introduce heated air into the heating chamber, such as by using a hot air steam provided in a rear of the chamber and circulating the heated air, such as by using a fan. Alternatively, heated air in the heating chamber can be provided by placing one or more heating elements on a ceiling of the heating chamber and again using a fan to circulate the air around the autoclave. Both ways use the process of heating the air in the autoclave to create heat sink for the retread process.

The other ways to provide heat or to supplement the heated air is by using an interior and/or an exterior electric heating pad element(s) within the tire curing package such as described above. This helps to achieve a quicker heat up time as well as save energy, and the use of one or both of these heating pad elements may preclude any need to utilize heated air in the heating chamber. The example process using just the heating pads for heating the curing package can avoid the use of a fan because the heat is being applied directly to the tire. The time of curing is lower due to the more efficient use of heat sink to the product with relation to time of curing temperature reached. Further, as compared to the prior art, cool-down time after curing may be significantly shortened as there will be no need to cool the entire autoclave.

As described for some of the examples above, the tire casing, tread, and adhesive (such as cushion gum) is assembled within an envelope with the electrical wires for control and power to the heating pad elements being made accessible, such as by being pulled through a grommet provided in the envelope in a sealed manner to maintain the seal for vacuum on the tire within the envelope, and use of a connector for assembling the envelope for quick and rugged use. The tire is then placed in the curing chamber with pressure and heat being applied as described herein to cure the tires. This process can save on energy usage through use of the electrical heating pad elements band achieving a desired curing temperature in approximately 10 minutes.

Generally, the curing package for an example embodiment using a curing chamber (autoclave) can be prepared as follows:

The retread package is prepped with its constituent components on a builder and is prepared in the curing package by placing the inner heat pad element within the tire casing. Then the inner envelop is placed in and around the inner casing over the inner heating pad.

Then the retread envelope is placed around the outside tread of the retread package. This retread envelope is used for preventing the cushion gum from pushing/being pulled up through the tire lugs as a vacuum is pulled on both the inner enveloped and retread once a seal is achieved. This process is called cushion migration and happens once the inside of the tire heats to about 190° F.

Once a seal is achieved and this package is vacuumed down the outer heating pad element is placed around the package. An outer envelope is then placed over the outer heat pad element for the purpose of starving the heat from oxygen to prevent fire and also prevent heat loss.

Once this process is complete, the resulting curing package is placed in the autoclave/chamber to apply external pressure around the tire. In some situations it may be desirable to use only a vacuum to provide sufficient pressure, and hence avoid the external pressure.

Second Example Curing System

Figure 6:
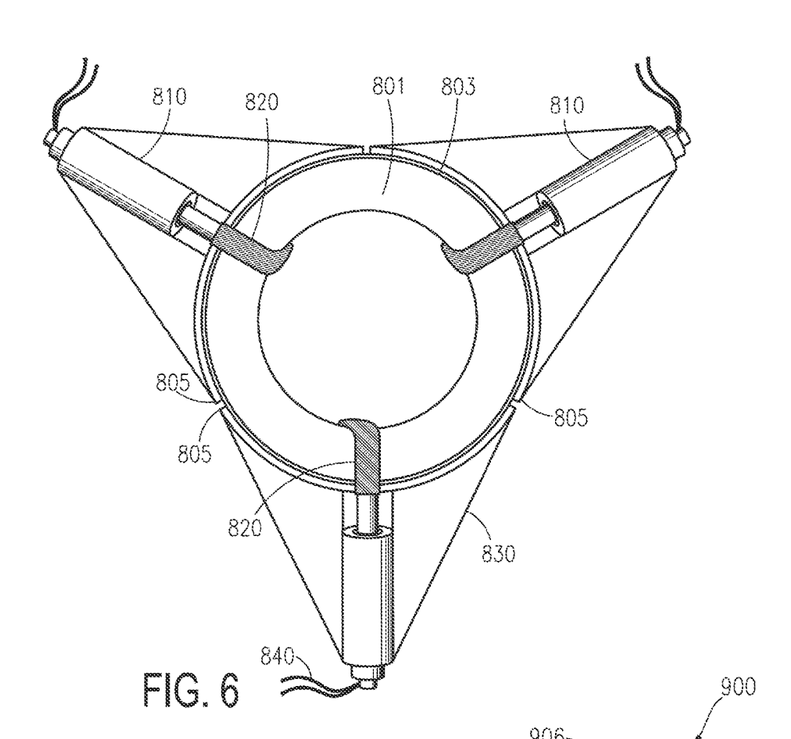
FIG. 6 illustrates an alternative system and/or method utilizing a pneumatic or hydraulic subsystem used for curing the tire retread package.

FIG. 6 depicts another example curing system 800 according to another embodiment that utilizes hydraulic or pneumatic systems to provide pressure to the tire tread during the curing process. In this example, a tire retread package 803 with tire assembly 801 is provided with one or more envelope portions 805 provided around the retread package. Each one of the envelope portions 805 is attached or otherwise connected via handle clamp 820 to one or more pneumatic or hydraulic cylinders 810 powered by a fluid line 840. The handle clamps 820 have a portion that is provided underneath the girth of the tire and attaches to the other side using a screw or lock device to completely encircle that portion of the tire. A brace 830 can be used to hold the entire curing package together. By activating the cylinders 810 to extend a piston, the handle clamps 820 put pressure on the envelope portions 805. Alternatively, the pistons of the cylinders 810 could be directly connected (or merely provided in contact with) to the envelope portions 805. Using an example tire assembly such as shown in FIG. 2 or 3 above, for example, the cylinders will to push the tire tread into the tire casing during curing to ensure that a good bond forms.

For example, the clamps 820 can be provided surrounding the tire and divided into 3 separate sectional units of envelope portions 805. On the inside of the clamp is provided a high temperature rubber to protect the metal. The sectional unit clamp is held on to the tire by a handle that comes underneath and screws to the other side. On the top of the sectional unit rim clamp is a hydraulic or air cylinder 810. These cylinders are used to apply pressure to the tire.

Hence, heat can be applied by using an interior heating pad element, an external heating pad element, or both. The heating pad elements may be held in place in any manner described herein or in an alternative manner. As described above, the heating pad elements will have data and power cables. Power will be provided by an external power supply, and the data cables will connect to a system controller to monitor and control the curing process.

Pressure is applied using the multi-part envelope via the cylinders using hydraulic or air pressure. For example, as shown, three envelope portions can be utilized or alternatively two, four or five portions could be used. Pressure is thus applied, for example, by using a cylinder and handle clamps with the envelope portions that surround the tire, and then heating can take place to cure the tire.

Alternative means of applying external pressure can utilize a mold, or a band in tension that can be provided around the tire. For example, a band connected by tension springs could alternatively provide pressure to the tread. For example, a pressure clamp surrounding the tire with a screw design can be provided on both sides of tire. The inside of the clamp that touches the tire is covered with high temperature rubber to protect the metal from conducting the heat. Pressure is then applied by screwing the two sides together and squeezing the tire in between. Or envelope portions can be provided that screw together or can be otherwise connected together to provide substantially equal pressure surrounds the tire. Once the clamps are tightly in place and pressure is achieved, then the heating pad elements are activated and heat transfer begins.

Third Example Curing System

Figure 7:
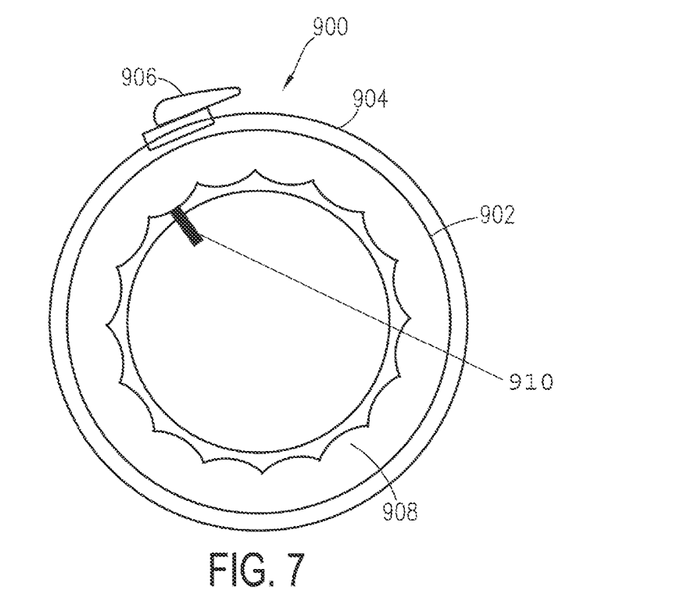
FIG. 7 illustrates another alternative system and/or method utilizing an inner tube bladder subsystem used for curing the tire retread package.

FIG. 7 depicts another example curing system 900 according to another embodiment that utilizes an inner tube (bladder) 908 for providing pressure. An outer envelope 904 is provided with connector clamp 906 to hold the retread package 902 together, and the bladder 908 (shown inside the tire casing) applies outward pressure on the tire casing to force the casing into the retread and then into the outer envelope 904. Again, as described above, heat can be applied by using an interior heating pad element, an external heating pad element, or both.

Pressure is applied by supplying the bladder 908 with air under pressure via nozzle valve 910 to inflate the bladder and thereby push on the inside wall of the tire casing applying force against the outer envelope 904 provided on the outside of the tire. Heat is provided by the heating pad elements (not shown) in a manner as described herein, with the process being controlled by a control system as described herein.

Other curing systems can also use various combinations of the features and methods described above, among others.

Heating Pad Elements

The interior (inner) and exterior (outer) heating pad elements described herein can be comprised of silicone bands or a flexible fiberglass or cloth with electric heating elements. The overlap of the bands can be protected with cloth insulation, for example. Furthermore, remote control of the curing process allows monitoring of the temperatures and status of the curing process. By using a controller to control the application of power (and hence control temperature) of the heating pads the process can be controlled and timed to allow for the proper curing of the retread package. This control can be automated using a computer or controller (e.g., a PLC), for example, or might be manually controlled by an operator monitoring the timing and temperatures.

Figure 9:
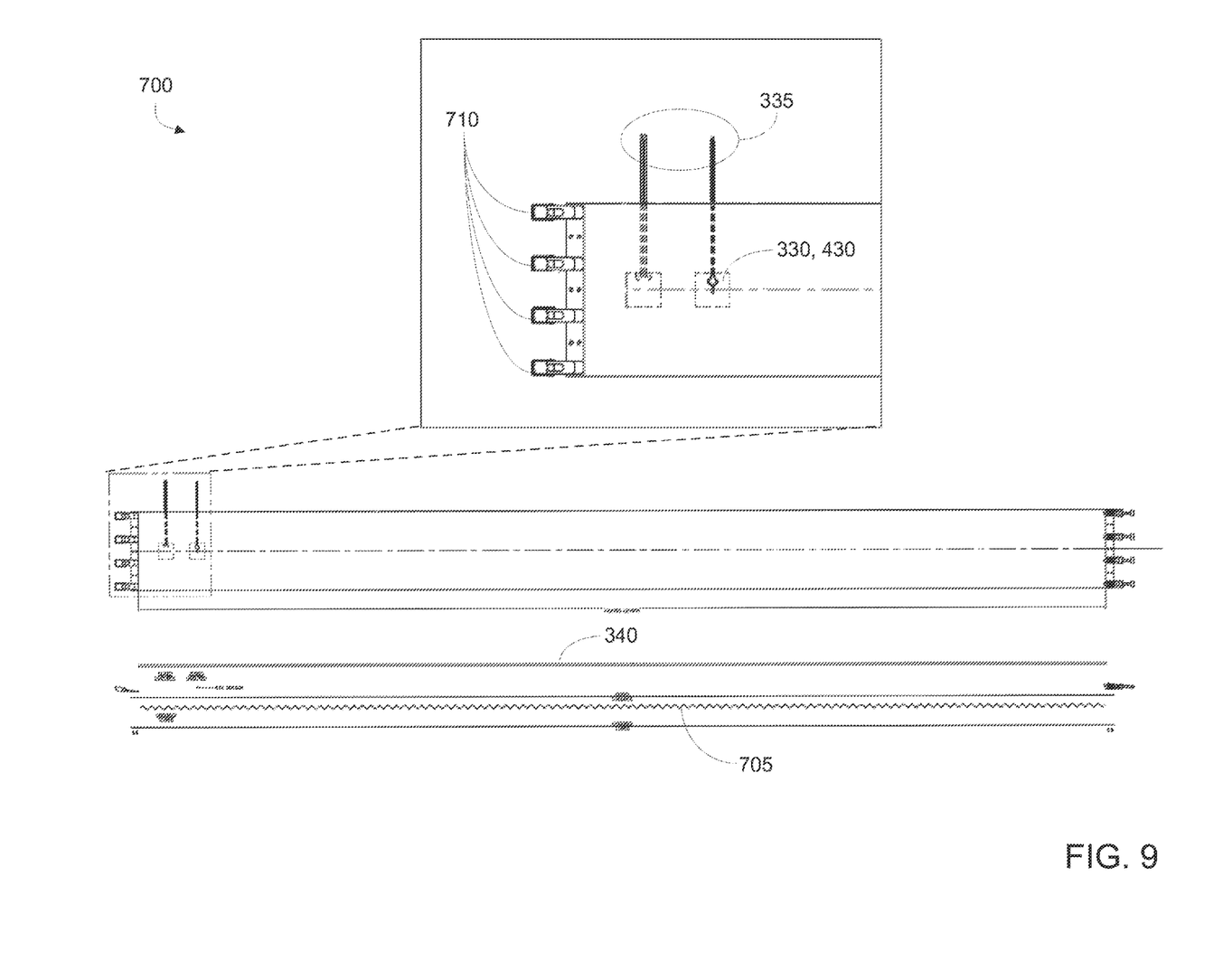
FIG. 9 is a line drawing of an exemplary heating pad element that can be used with one or more embodiments.

FIG. 9 is a line drawing of an exemplary heating pad element 700 according to one embodiment of the present invention, such as may be used for any of the examples described herein. This exemplary heating pad element 700 may be an interior or an exterior heating pad element as was described relative to the previous figures. The FIG. 9 heating pad embodiment may comprise heating element(s) 705 of resistive conductors operable to generate thermal energy when a voltage is applied via leads 335. A temperature sensors 330, 430 may be leveraged to generate a data signal that correlates to the temperature of the heating pad element 700 such that voltage and/or amperage provided to the heating pad element 700 may be varied in order to vary the amount of thermal energy generated. In this way, one of ordinary skill in the art will recognize that the thermal energy may be varied in order to accommodate various cure temperatures, cycle times, ramp times, soak times and the like required for various retread tire packages.

Further, the heating pad element 700 may comprise an insulation layer 340, as described above relative to previous figures. Moreover, heating pad element 700 may comprise fastener components 710 for securing the element 700 in a given curing package. Also, it is envisioned that heating pad elements may be flexible or even substantially rigid and, as such, the particular materials of construction or design of the heating pad element used in any given embodiment of the invention will not limit the scope of the disclosure. It is further envisioned that the specific performance specifications of heating pad elements may vary according to application and, as such, any specific heating pad design or specification will not be construed to limit the scope of the disclosure. Suitable voltage and amperage ranges for heating pad elements will occur to those of ordinary skill in the art of tire retreading or rubber molding. For exemplary purposes only, a non-limiting listing of various heater pad designs, including rigid and flexible designs, having myriad voltage/amperage/materials of construction combinations is appended to the present disclosure.

Advantageously, power requirements for heating pad elements 700 can be minimized and heat-up time of the retread process optimized by applying heat directly to the retread tire package using such a heating pad element 700 as an interior and/or exterior heating pad element in the manner described above. Current systems and methods known in the art may require a relatively high current draw of 480V, 3-phase power be supplied to the single, large heating element tasked with heating the tire retread packages along with the entire curing chamber. By contrast, certain embodiments can be provided to utilize 240V, single phase power in relatively lower current levels be supplied to the individual tire retread packages being cured. As such, one of ordinary skill in the art will recognize that embodiments of the present invention may consume less aggregate energy for a given cycle than current systems and methods known in the art. Further, with heating pad elements, one of ordinary skill in the art will recognize that distributed wattages or multiple heater circuit designs are possible with heating elements.

For any of the above described embodiments, to achieve a quicker heat up time heating pad elements can be placed on both the outside circumference of the tire (i.e., an exterior heating pad element) and the inside wall of the tire (i.e., an interior heating pad element). Any overlap of the heating pad elements (such as those provided as a strip or band) can be protected using cloth insulation. The heating pad elements can be arranged as bands made of silicone but can also be made out of fiberglass or other materials. This is to allow one band to be made sufficiently long to fit many different sizes of tires and allow multiple uses. Once both heat bands are securely in place the tire components are formed into a package to be pressurized as described herein. The use of the heat band in the wall of the tire and on the top of the tire allows for the tire to begin heat sink quicker and heat is emanated from both sides to cure the cushion gum in the middle of the tire.

Figure 8A:
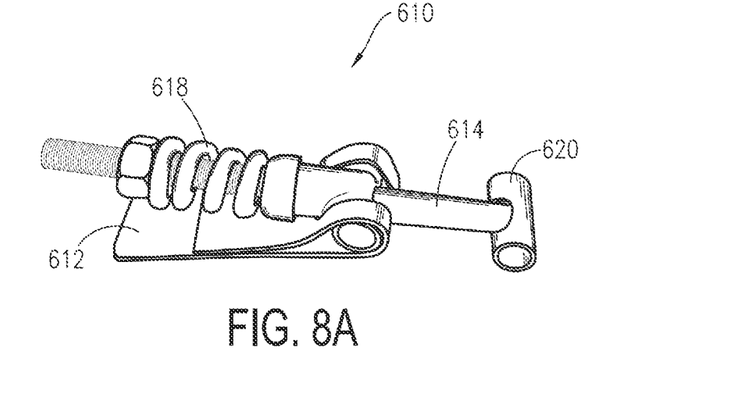
FIGS. 8A-8C depict an exemplary fastener comprised within various embodiments of heating pad elements according to at least one embodiment.
Figure 8B:
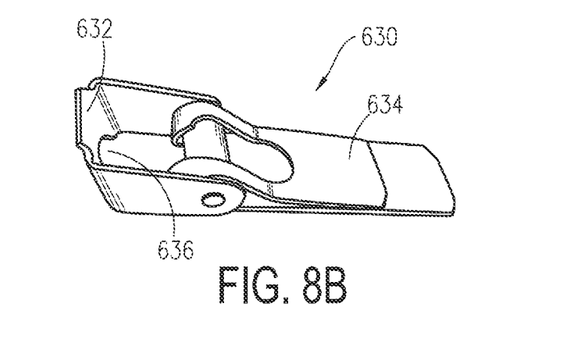
Figure 8C:
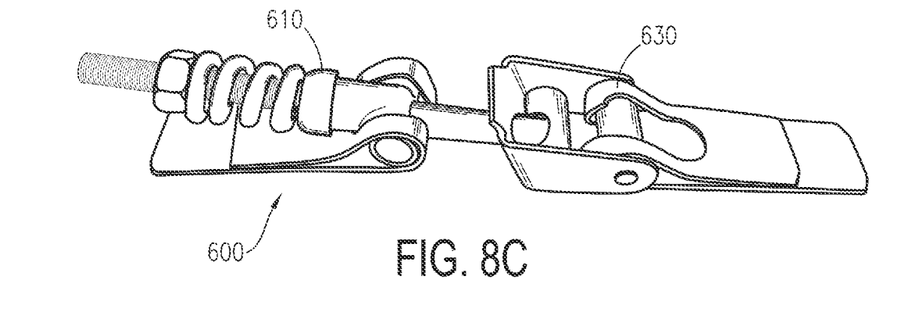

FIGS. 8A-8D depict an exemplary fastening aspect comprised within various embodiments of heating pad elements and/or envelopes according to various embodiments described herein. One of ordinary skill in the art will recognize the functionality of the exemplary fastening components depicted in FIGS. 8A-8C. Provided is a first connector part 610 comprising a spring 618, a base 612 to attach to an end of a corresponding envelop or heating pad element, a shaft 614 connected to a first connector end 620. Also provided is a second connector part 630 having a base 634 for attaching to another end of the envelop or heating pad element, and a second connector end 634 with a slot 636. The first and second connector parts 610, 630 are shown in a connected state 600 in FIG. 8C. Notably, the fastening component depicted in FIGS. 8A-8C is offered for exemplary purposes only and will not limit the scope of fastening means that may be comprised in any given embodiment of the invention.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A method for performing a tire retread, comprising the steps of:
   placing a layer of adhesive on an outer surface of a tire casing;
   placing a retread over the adhesive layer on the tire casing to form a retread package;
   placing one side of a heating pad in contact with a surface of the retread package and encircling the retread package, said heating pad comprising an electrical resistive heater having an electrical power input and a sensor having a temperature signal output, said output being configured to connect to a control system;
   placing a structure on another side of the heating pad in contact with the heating pad;
   applying an inward force to the structure to move said structure toward the retread package to compress the adhesive layer between the tire casing and the retread, wherein said force also compresses said heating pad into the retread, wherein said structure comprises a plurality of separate plates adapted to push said retread in place against said tire casing; and
   while applying said force, using the heating pad to heat the retread package to cure said adhesive while controlling the temperature of said heating pad based on a value of the temperature signal output of the sensor.

2. The method of claim 1, wherein another heating pad is placed into an interior of the tire casing in contact with the tire casing.

3. The method of claim 1, wherein said heating pad is provided around an exterior circumference of said retread.

4. The method of claim 3, further comprising the step of placing another heating pad into an interior of the tire casing, wherein, while applying said force, also using the other heating pad to heat the retread package to cure said adhesive.

5. The method of claim 3, wherein said force is provided by providing a vacuum or pressure to said structure.

6. The method of claim 1, wherein said force is provided by applying said force to said structure using a plurality of pistons connected to the structure.

7. The method of claim 1, wherein said heating pad is an electrical resistive heating pad strip that is placed in contact with the retread package by wrapping the heating pad strip around an outer surface of the retread.

8. A method for performing a tire retread, comprising the steps of:
placing a layer of adhesive on an outer surface of a tire casing;
placing a retread over the adhesive layer on the tire casing to form a retread package;
placing a heating device having one side in contact with and encircling the retread package for heating the retread package by contact, said heating device comprising an insulating layer and a heating pad including an electrical resistive heater with a power input and a sensor with a temperature signal output configured to connect to a control system;
providing a structure at least partially surrounding an outer circumference of said retread package around another side of the heating device in contact with the heating device;
applying an inward force to the structure to move the structure toward the retread packages to compress the adhesive layer between the tire casing and the retread by pushing said retread toward said tire casing wherein said force also compresses said heating device into the retread, wherein said force is provided by pushing said structure toward said retread package using an actuator; and
while applying said force, using the heating device to heat the retread package to cure said adhesive while controlling the temperature of said heating pad based on a reading of the sensor.

9. The method of claim 8, wherein said heating device is provided in an exterior of said retread package, with said method further comprising the step of placing another heating device around an interior of the retread package for heating the retread package while applying said force.

10. The method of claim 8, wherein said heating device is provided around an outer circumference of said retread.

11. The method of claim 8, wherein said force is applied to said retread from a perimeter of said retread package using a plurality of pistons.

12. The method of claim 11, wherein each one of said pistons is a hydraulic or pneumatic piston.

13. The method of claim 8, wherein said force is applied to said structure from a perimeter of said retread package using a plurality of pistons.

14. The method of claim 13, wherein each one of said pistons is a hydraulic or pneumatic piston.

15. A method for performing a tire retread, comprising the steps of:
placing a retread on an outer surface of a tire casing with an adhesive provided between said retread and said tire casing to form a retread package;
placing a heating pad around a circumference of the retread package with one side in contact with an outer surface of the retread, said heating pad comprising an electrical resistive heater having a power input and a sensor having a temperature signal output configured to connect to a control system;
encircling the retread package with a structure configured with a plurality of pistons to compress said retread package using an applied force to push said retread and another side of said heating pad toward said tire casing, said structure being provided in contact with the heating pad;
applying the force inwardly to the structure move the structure toward the retread package to compress the adhesive layer between the tire casing and the retread, wherein said force compresses said heating pad into the retread; and
while applying said force, using the heating pad to heat the retread package to cure said adhesive while controlling the temperature of said heating pad based on a reading of the sensor.

16. The method of claim 15, wherein said structure is comprised of a plurality of separate plates each conforming to a portion of the circumference of the retread, and wherein said force is comprised of a plurality of separate forces, each one of which pushes a corresponding one of the plates in toward the retread.

17. The method of claim 15, wherein said heating pad is an electrical resistive heating pad that is placed in contact with the retread package by wrapping the heating pad around the outer surface of the retread.

18. A method for performing a tire retread, comprising the steps of:
placing a retread around a tire casing to form a retread package, wherein an adhesive layer is provided between said casing and said retread;
placing one side of an electrical resistive heating pad in contact with and encircling a circumferential surface of the retread package, said heating pad including a power input and a temperature sensor having a temperature signal output, said output being configured to connect to a control system;
encircling at least a portion of an outer circumference of the retread with a structure configured to be pushed into another side of the heating pad in contact with the heating pad to compress said retread package using an applied force;
applying said force inwardly into the structure to compress the adhesive layer between the tire casing and the retread, wherein said force also compresses said heating pad into the retread, wherein said structure is comprised of a plurality of separate plates; and
while applying said force, using the heating pad to heat the retread package via the contact of the heating pad with the retread package to cure said adhesive while controlling the temperature of said heating pad based on a value of the temperature signal output of the sensor.

19. The method of claim 18, wherein said heating pad is formed as a strip that is placed in contact with the retread package by wrapping the strip around an outer surface of the retread.

20. The method of claim 19, further comprising the step of providing another heating pad that is placed in contact with the retread package by placing the other heating pad around an inner circumference of the tire casing.

21. The method of claim 18, wherein said force is provided using a plurality of pistons.

22. A method for performing a tire retread, comprising the steps of:
- placing a retread around a tire casing to form a retread package, wherein an adhesive layer is provided between said casing and said retread;
- placing an electrical resistive heating pad around an outer circumference on an outer surface of the retread with an inner side of the heating pad facing the outer circumference, said heating pad including a temperature sensor having temperature signal output, said output being configured to connect to a control system;
- providing a plurality of pistons;
- providing a plurality of plates, each one of said plates being associated with a respective one of said plurality of pistons, wherein each one of said plates is configured to conform to a portion of the retread, and wherein each one of said plates is provided in contact with an outside of the electrical resistive heating pad;
- applying an inward force to each one of the plates to move the plates toward the retread package to compress the adhesive layer between the tire casing and the retread, wherein said force also compresses said heating pad into the retread; and
- while applying said force, using the heating pad to heat the retread package while controlling the temperature of said heating pad based on a value of the temperature signal output of the sensor.

* * * * *